United States Patent Office 3,168,803
Patented Feb. 9, 1965

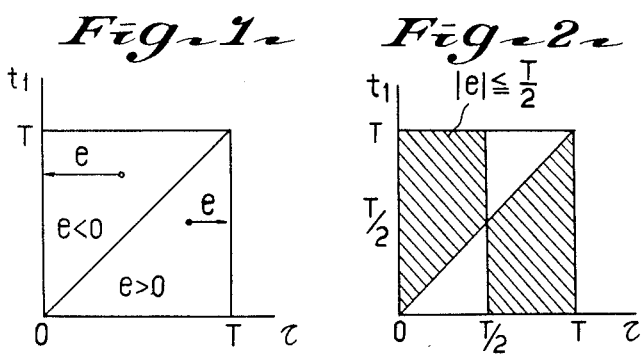
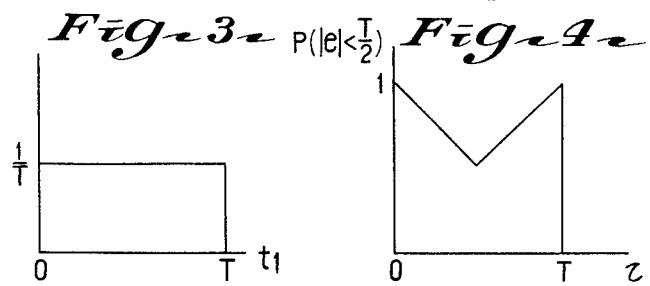
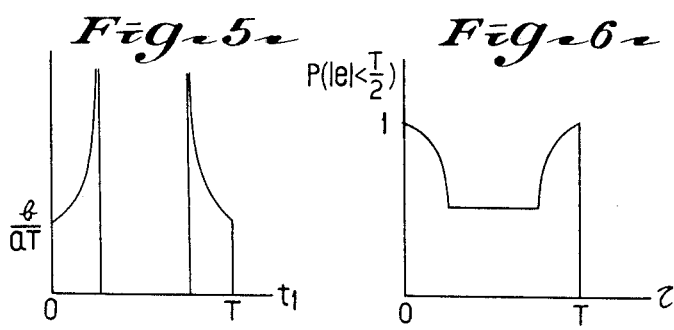
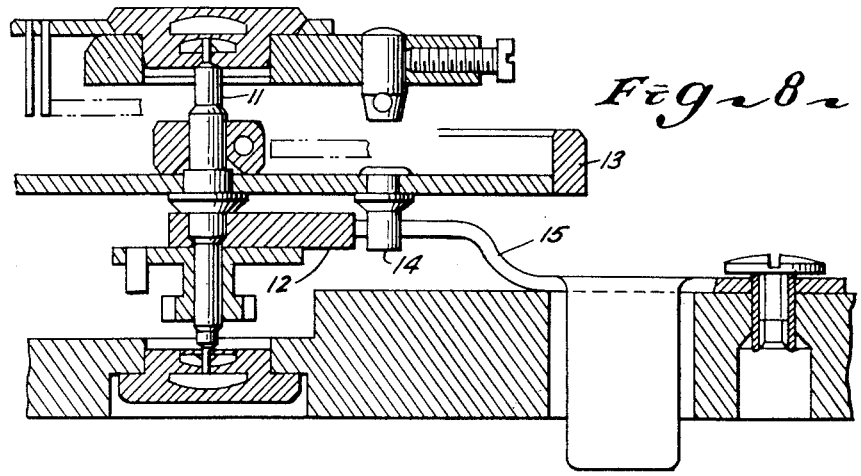

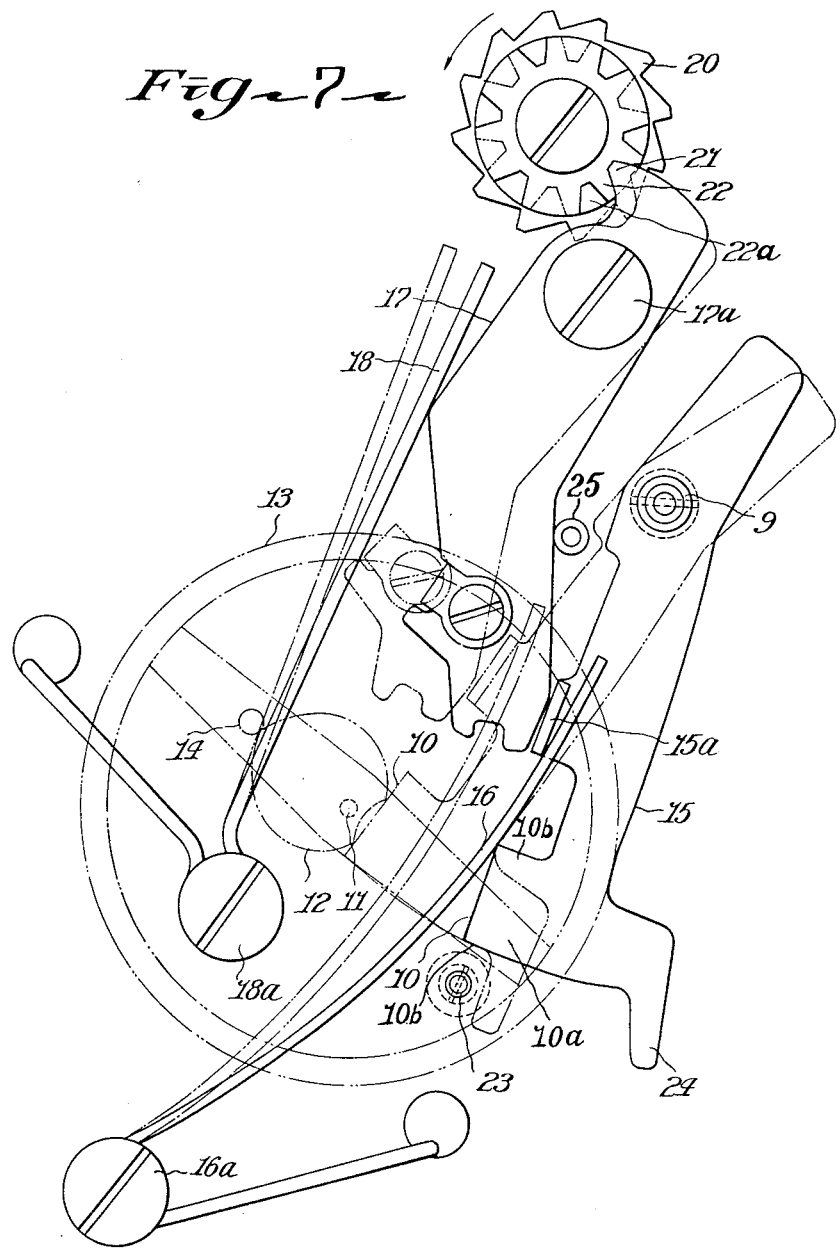

3,168,803
TIME MEASURING INSTRUMENT
Tatsuya Ishiwara, Sugano-machi, Ichikawa-shi, Koichi Ogawa, Mitaka-shi, Tokyo-to, and Shojiro Komaki and Yoshio Yamamoto, Koiwa-machi, Edogawa-ku, Tokyo-to, Japan, assignors to Kabushiki Kaisha Daini Seikosha, Tokyo-to, Japan, a joint-stock company of Japan
Filed Feb. 18, 1963, Ser. No. 259,343
Claims priority, application Japan, Feb. 20, 1962, 37/6,411; Sept. 4, 1962, 37/37,379, 37/37,380
4 Claims. (Cl. 58—79)

This invention relates to horologic instruments, and more particularly it relates to a new time measuring instrument having means for eliminating error due to the phase of the balance (balance wheel) at the time of starting and stopping of the time measuring instrument.

In general, in a timekeeper such as a stopwatch, the second hand is moved intermittently during one oscillation (defined here as ½ of the cyclic period in the case of an anchor escapement), 5 oscillations per second and 10 oscillations per second being most commonly used.

In the case when the time to be measured is substantially long, such a feature as above-stated does not become problematical; but when the time to be measured is short, and, moreover, a high degree of precision is required, problems arise. For example, in the case of a 100-meter running race, the time to be measured is often between 10 and 12 seconds, and the 0.1-second unit of this time is highly significant.

In the measurement of such a short time, error due to the period of the balance becomes amply small (for example, becoming 0.001 second or less in the case of a 100-meter running race). In comparison, errors due to the psychological and physical condition of the human operator and the error due to the phase of the balance, which will be described hereinafter, are of a magnitude which cannot be neglected.

It is an object of the present invention, in its broader aspects, to provide a new time measuring instrument having means for eliminating error due to the phase of the balance at the time of starting and stopping of the said instrument.

It is another object of this invention to provide a new starting and stopping mechanism for time measuring instruments.

It is still another object to provide a starting and stopping mechanism as above-stated which is provided with means for effectively arresting excessive movement due to inertia of the balance assembly at the time when it is being stopped.

It is a further object to provide a starting and stopping mechanism as above-stated which is provided with means for effectively preventing impact stress from being imparted to the balance staff at the time of stopping of the balance.

Said objects and other objects of this invention have been attained by the instrument having means for starting and stopping a balance for governing the timing operation of the said instrument, the said means being so adapted as to stop the said balance in a position displaced from the center position of its oscillation, and being so further adapted that, by the releasing of the said balance in order to start the said balance from its stopped state, the said balance is caused to start moving under energy which has been stored as a result of the said displaced position.

The nature, principles, and details of the invention will be best understood by reference to the following description when taken in conjunction with the accompanying drawings in which like parts are designated by like reference numerals and letters, and in which:

FIGS. 1 through 6, inclusive, are graphical representations to be referred to in the following description of the principle of the invention; and FIGS. 7 and 8 are respectively, a plan view and an elevational view showing a preferred embodiment of the invention in a specific form.

While the following description will be concerned principally with the invention as applied to stopwatches, for the sake of convenience in exposition, it is to be understood that the invention is not to be limited to stopwatches.

Broadly classified, stopwatches are of two types, namely, the start-stop type wherein the balance is operated only during the time to be measured, and the clutch-type wherein the balance oscillates constantly and movement is transmitted to the indicator hands only during the time being measured. In either case, a time interval $t_1$ is required from the time instant at which the pendant is pressed to accomplish starting operation to the instant the hands complete the first movement. If the fractional remainder resulting from the division of the true value of the measured time by the time T for one oscillation is denoted by $\tau$, the error $e$ (indicated value minus the true value) due to the phase of the balance is expressed by the following Equation 1.

$$\text{When } t_1 < \tau \quad e = T - \tau$$
$$\text{When } t_1 > \tau \quad e = -\tau \quad (1)$$

This relationship may be represented graphically as in FIG. 1.

While the intermittent movement of the indicating hands has the advantageous feature of being able to eliminate error in reading, the error $e$ cannot be avoided.

That is, in the case, for example, when the true time is 13.42 seconds, and $T = 0.1$ second ($=0.02$ second), $e = -0.02$ if the indicated value is 13.4, and $e = +0.08$ if the indicated value is 13.5. Accordingly, the condition $$|e| \geq -\frac{T}{2}$$

is ideal here, and $$|e| \geq \frac{T}{2}$$

is undesirable. FIG. 2 is a graphical representation in which the representation of FIG. 1 is divided into two regions corresponding to the above-defined conditions.

The time $t_1$ is determined by the phase of the balance at the instant the pendant is pressed to accomplish starting operation. Since it is not possible for the operator making the measurement to know the value of this time $t_1$ on each occasion, this value is a probable quantity. By consideration of the probability distributions, it is found that the distribution for a clutch type stopwatch is of rectangular form where $t_1$ is constant from zero to T as shown in FIG. 3. Consequently, the probability for the condition $$|e| \leq \frac{T}{2}$$

is that which is graphically represented in FIG. 4. Of course, the case here considered is one in which the clutch mechanism has no imperfections whatsoever; in an actual case, the probability would be much lower.

In a start-stop type stopwatch, the probability density function of $t_1$ is given by the following Equation 2.

$$F(t_1) = \frac{\sec^2 \frac{\pi t_1}{T}}{T\sqrt{\left(\frac{a}{b}\right)^2 - \tan^2 \frac{\pi t_1}{T}}} \quad (2)$$

where $a$ is the amplitude of oscillation of the balance under normal operational condition, and $b$ represents the velocity at which the balance is started as converted into the angular unit by the following Equation 3.

$$b = \frac{T\omega}{\pi} \quad (3)$$

The probability for the condition $$|e| \leq \frac{T}{2}$$

is as follows:

$$\int_\tau^T F(t_1) dt_1 \text{ when } \tau \leq \frac{T}{2}$$

$$\int_0^\tau F(t_1) dt_1 \text{ when } \tau \geq \frac{T}{2}$$

This probability is graphically represented in FIG. 5.

In view of the foregoing consideration, it will be seen that, in the case of a conventional stopwatch, the probability for attainment of the condition $$|e| \leq \frac{T}{2}$$

that is, the probability of the fractional remainder time being correctly disposed of (by being counted as unity if it is 0.5 or higher and being discarded if it is less than 0.5), is not very high. Under such a circumstance, when the same time interval, such as that of a competitive race, is measured by means of several stopwatches, the measured values indicated by all of the stopwatches cannot be expected to coincide, even when the stopwatches are adjusted to a high degree of precision and used by skilled operators. Rather, lack of coincidence of measured values may be considered to be quite normal under such a circumstance.

The present invention contemplates the complete elimination of the above-described error by providing, in a start-stop type stopwatch, means whereby at the instant of stopping, the balance is stopped in a position of which its angle of rotation is displaced by a certain angle or a larger angle relative to the center position of oscillation of the balance, and at the time of starting, the balance is released without an initial velocity being imparted thereto. The term "a certain angle" used herein is an angle which is sufficient for the balance to release the stopped state of the escapement at the time of starting, and which, thereafter, has no adverse effect on the continuation of oscillation.

By the above-stated means, the time interval $t_1$ for the hands to accomplish their first movements is always $T/2$, and it will be seen that the condition $$|e| \leq \frac{T}{2}$$

is constantly valid, as will be apparent also from FIG. 2. That is, if two or more stopwatches are started, simultaneously, their balances will oscillate with the same phase. Then, if these stopwatches are stopped simultaneously, they will indicate the same value. Moreover, this value so indicated will be a value resulting from the correct disposal of the fractional remainder of one oscillation (by being counted as unity if it is 0.5 or higher and being discarded if it is less than 0.5) of the true time. Thus, a measured value of much higher reliability than that by conventional means can be obtained in such cases as speed races in sports wherein time intervals of the order of that corresponding to one oscillation become problematical.

In carrying the invention into practice, that is, in order to cause the initial phase of the balance at the time of balance starting to be constant, it is necessary that the braking means for stopping the balance be one which effectively governs the inertia of the balance assembly. The present invention, in this aspect thereof, provides a balance stopping means which, operating cooperatively with the balance, effectively governs the balance inertia and causes the initial phase to be always constant at the time of balance starting. The details of the invention, in this aspect, will now be described in conjunction with a preferred embodiment.

Referring to FIGS. 7 and 8, a heart cam 12 for setting the balance is fixed to a balance staff 11 supporting a balance wheel 13 fixed thereto. A balance setting pin 14 is fixed to the balance wheel 13. A lever 15 for controlling the stopping and releasing of the balance is pivoted about a pivot 9 on a base plate not shown, the front surface 10 of a laterally projecting portion 10a at its end being engageable with the heart cam 12, and the side surface 10b of the projecting portion 10a being engagable with the pin 14 of the balance. A spring 16 is supported by a member 16a and has elastic force tending to turn it in the counter-clockwise direction relative to the member 16a, whereby the end of this spring 16 is pressed against one side of a riser part 15a of the lever 15 and imparts to this lever 15 a tendency to rotate clockwisely about its pivot 9. A starting lever 17 which is pivoted about a pivot 17a receives the elastic, clockwise force of a spring 18 pivotally supported at 18a on the base plate, whereby the end of this lever 17 is pressed elastically against the other side of the riser part 15a of the lever 15 and positions the lever 15 in its position indicated by full line. At the same time, a tooth 21 provided on the rear end of the lever 17 engages with one of the columns 22a provided about a cam 22 which is integrally formed with a ratchet wheel 20.

The mechanism of this invention of the above-described construction and arrangement has the following operation. When, by a known means, the ratchet wheel 20 is rotated by one pitch (or tooth) in the counter-clockwise direction, the tooth 21 is pushed upwardly by the column 22a of the cam 22. Consequently, the starting lever 17 is rotated clockwisely and assumes its position indicated by chain line. Accordingly, the lever 15 simultaneously rotates clockwisely in accordance with the force of the spring 16 to assume its chain-line position, thereby pressing against the heart cam 12 and stopping the balance. In this case, however, the balance wheel 13 is always caused by the engagement movement of profile of the heart cam 12 and the front surface 10 of the lever 15 to stop in an angular position of oscillation angle of approximately ±180 degrees. That is, when the balance position is between zero and +360 degrees, the balance wheel stops at approximately +180 degrees, and, when the balance position is between zero and −360 degrees, the balance wheel stops at approximately −180 degrees. However, when the balance enters within the constraint angle of the anchor, the balance wheel stops at a position of approximately 180 degrees in the direction of motion of the balance at the time.

However, since the balance is oscillating with considerable inertia against the braking movement of the lever 15, there is the possibility of slipping occurring between these two members, the heart cam over-riding or advancing excessively, and the stopping of the balance at the required oscillation angle position becoming impossible. The pin 14 provided on the balance of the mechanism of this invention as a countermeasure for this possibility stops against the side surface 10b of the lever 15 holding the heart cam 12, whereby it is possible to suppress effectively any excessive advancing of the heart cam 12, that is, of the balance. Therefore, the present invention has succeeded in fully and positively stopping the balance at the required oscillation position.

When the ratchet wheel 20 is driven through the angle of the succeeding pitch, the tooth 21 slips into a groove between the columns 22a of the cam 22, and the starting lever 17 returns to its full-line position in which it engages a stop 25. Accordingly, the lever 15 also returns to its full-line position, separating from the heart cam 12, whereupon the balance wheel 13, that is, the balance, begins oscillation with zero initial velocity from the position of 180 degrees displaced angle at which it has been previously stopped.

As described above, the balance is caused to stop with respect to the lever 15. However, since the state of the lever 15 finally pressing against and arresting the balance, that is, the heart cam 12 is that which imparts a pressing force perpendicular to the axis of the balance staff 11, the said force becomes an impact force with the possibility of damaging the balance staff. In order to prevent such damage, the present invention further provides means whereby the above-described balance arresting mechanism is caused to arrest the balance in a safe manner without imparting impact stress on the balance staff during the balance stopping operation. The said means may, for example, be provided by a stop 23 fixed to and so positioned on the base plate as to be engageable by a positioning lug 24 formed on the end of the aforementioned lever 15 as shown in FIG. 11. At the end of the balance arresting operation, the lug 24 strikes against the stop 23, and the front surface 10 of the end of the lever 15 which is so stopped merely contacts the part of the heart cam 12 to be stopped and brakes the rotating force of the heart cam 12. Accordingly, it is possible to arrest the balance in a safe manner without imparting any impact stress to the balance staff.

Although this invention has been described with respect to particular embodiments thereof, it is not to be so limited as changes and modifications may be made therein which are within the full intended scope of the invention, as defined by the appended claims.

What is claimed is:

1. A device for starting and stopping a stop watch having a base plate, balance staff and a balance wheel fixed thereon, comprising a heart-shaped cam fixed on said balance staff adjacent said balance wheel, a pin projecting laterally from said balance wheel adjacent the high point of said cam, a first lever for controlling the stopping and releasing of said balance wheel, said lever having a first face engageble with said cam and a second face engageable by said pin and being pivoted on said base plate for pivotal movement from a first position for engagement of said first face with said cam and engagement of said second face by said pin to stop said balance wheel and a second position in which said lever is retracted, a first spring biasing said lever to said first position, a second lever for actuating said first lever, said second lever being engageable with said first lever and being pivotally mounted on said base plate for movement between a first position in which it is retracted and a second position in which it engages said first lever to move said first lever to said second position to release said balance wheel, a second spring biasing said second lever to said second position, said second spring being stronger than said first spring, and means for manually moving said second lever to said first position against the force of said second spring, thereby permitting said first lever to be moved to its first position by said first spring to stop said balance wheel.

2. A device according to claim 1, in which said means for manually moving said second lever to said first position comprises a tooth on said second lever, a rotatable cam wheel having circumferentially spaced high spots engageable with said tooth to move said second lever to said second position and intervening low spots receiving said tooth to permit movement of said second lever to said first position by said second spring and a ratchet wheel coaxial with and fixed to said cam wheel and actuatable to rotate said cam wheel step-by-step to present said high spots and low spots successively to said tooth on said second lever.

3. A device according to claim 1, further comprising abutment means engageable with said first lever to limit the movement of said first lever by said first spring and thereby avoiding undesirable impact force of said first lever on said balance staff.

4. A device according to claim 1, further comprising abutment means for limiting movement of said second lever by said second spring.

References Cited in the file of this patent

UNITED STATES PATENTS

| | | |
|---|---|---|
| 1,083,917 | Brice | Jan. 13, 1914 |
| 1,133,028 | Hill | Mar. 23, 1915 |
| 1,848,810 | Watson | Mar. 8, 1932 |
| 2,212,535 | Tyres | Aug. 27, 1940 |
| 2,480,760 | Morse | Aug. 30, 1949 |
| 2,714,547 | Francis | Aug. 2, 1955 |
| 2,942,410 | Schoenrock | June 28, 1960 |
| 3,034,282 | Nathanson | May 15, 1962 |
| 3,034,285 | Reese et al. | May 15, 1962 |
| 3,059,412 | Epperlein | Oct. 23, 1962 |